United States Patent [19]

Marshall

[11] Patent Number: 5,081,876
[45] Date of Patent: Jan. 21, 1992

[54] SLIDE VALVE POSITION INDICATOR AND MAGNETIC COUPLER

[75] Inventor: Arthur J. Marshall, Etters, Pa.

[73] Assignee: Carrier Corporation, Syracuse, N.Y.

[21] Appl. No.: 161,552

[22] Filed: Feb. 29, 1988

Related U.S. Application Data

[62] Division of Ser. No. 92,827, Sep. 3, 1987, Pat. No. 4,743,170.

[51] Int. Cl.[5] ............................................. F16H 27/02
[52] U.S. Cl. ............................... 74/89.21; 74/DIG. 4
[58] Field of Search .......................... 74/89.21, DIG. 4

[56] References Cited

U.S. PATENT DOCUMENTS 4,290,317  9/1981  Hehl ..................................... 74/89.2
4,435,991  3/1984  Hehl ..................................... 74/89.2
4,717,873  1/1988  Carr, Jr. et al. ..................... 324/207

FOREIGN PATENT DOCUMENTS 58-217857  12/1983  Japan ................................. 74/89.15

Primary Examiner—Rodney H. Bonck

[57] ABSTRACT

Movement in a pressurized environment is transmitted to a non-pressurized environment by means of a strong magnetic coupling whereby linear movement of a magnet in a pressurized environment causes linear movement of a surrounding magnet which is in a non-pressurized environment. Because of the strong magnetic coupling, the surrounding magnet is used to drive a linear to rotary motion converter. In the preferred embodiment, the pressurized environment is within a screw compressor.

3 Claims, 3 Drawing Sheets

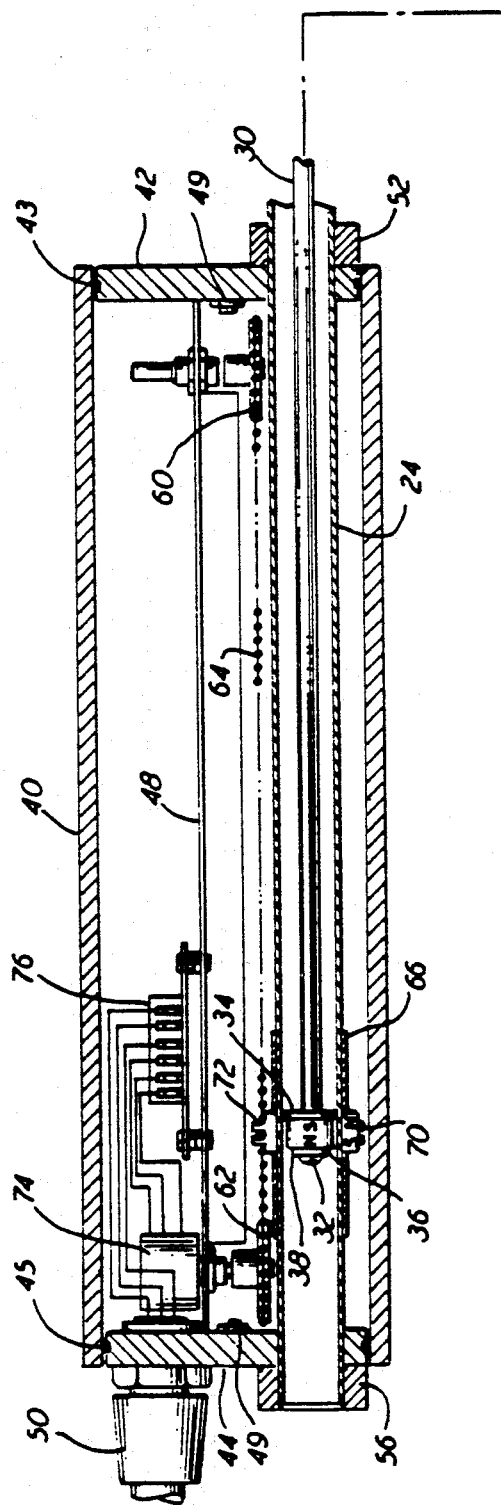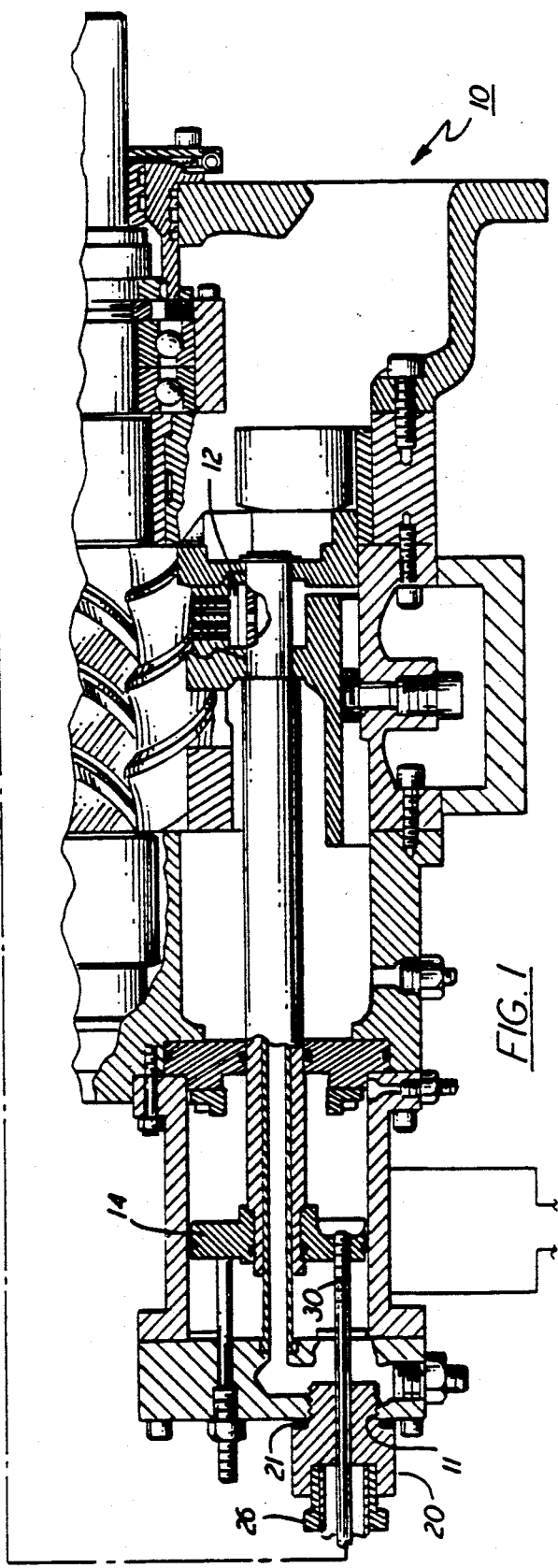
FIG.1

SLIDE VALVE POSITION INDICATOR AND MAGNETIC COUPLER

This is a division of application Ser. No. 092,827 filed Sept. 3, 1987 and now U.S. Pat. No. 4,743,170.

BACKGROUND OF THE INVENTION

In screw compressors, unloading is typically achieved by means of a slide valve which is reciprocated along an axis which is parallel to the axes of the helical rotors. The position of the slide valve relative to the rotors adjusts the size and duration of opening of the suction port by changing the effective length of the rotors and thereby the trapped volume. Because the slide valve position is thus directly related to the compressor output, the position of the slide valve has been sensed and a feedback signal provided to the control system which controls compressor capacity by positioning the slide valve. Additionally, an indicator can be positioned by the slide valve as it is moved.

In the past, the feedback and/or indicator structure ordinarily required the passage of a rod through the compressor casing. The rod would move with the slide valve and, although the rod is sealed, there have been problems due to leakage. The sealing problems were overcome in U.S. Pat. No. 3,738,116 which has the rod located in a sealed tube. The rod is in an inner tube and carries a magnetic member which coacts with an annular magnetic member surrounding the inner tube. The position of the annular magnetic member gives a visual indication of the slide valve position. Additionally, the annular magnetic member coacts with reed switches located in the inner wall of the outer tube when the annular magnetic member and therefore the slide valve is at one or more specific locations. This, however, does not satisfy the need for a direct, continuous output indicative of the slide valve position.

SUMMARY OF THE INVENTION

The present invention is directed to a device in which one end of a rod is secured to a hydraulically-actuated piston and moves therewith. The other end of the rod moves in an inner, hermetically sealed, non-magnetic tube and carries a cylindrically shaped magnet. An annular magnet surrounds the inner tube and follows the movement of the cylindrically shaped magnet. The annular magnet is secured to a bead chain which is strung around two, spaced sprockets. One of the sprockets is connected to a potentiometer and imparts rotary motion to the potentiometer responsive to the linear movement of the magnets. The inner tube, annular magnet, sprockets and potentiometer are located within an outer tube which defines a non-pressurized environment.

It is an object of this invention to provide an analog output of the internal position of a slide valve in a screw compressor.

It is another object of this invention to change linear motion within a pressurized environment to a linear motion outside of the pressurized environment which is, in turn transformed into a rotary motion.

It is a further object of this invention to eliminate the need for dynamic pressure seals in transferring motion from a pressurized to a non-pressurized environment.

It is an additional object of this invention to adapt existing compressors in the field for microprocessor control These objects, and others as will become apparent hereinafter, are accomplished by the present invention.

Basically, linear motion of a slide valve within a pressurized environment is converted to linear motion in a non-pressurized environment by means of a magnetic coupling. The magnetic coupling is directly coupled to a linear to rotary motion mechanism for driving a rotary potentiometer. The output of the potentiometer is supplied as a feedback to the microprocessor control which controls compressor loading by positioning a slide valve.

BRIEF DESCRIPTION OF THE DRAWINGS

For a fuller understanding of the present invention, reference should now be made to the following detailed description thereof taken in conjunction with the accompanying drawings wherein:

FIG. 1 is a sectional view of the slide valve, position indicator and a portion of the compressor;

DESCRIPTION OF THE PREFERRED EMBODIMENT

Figure 2:
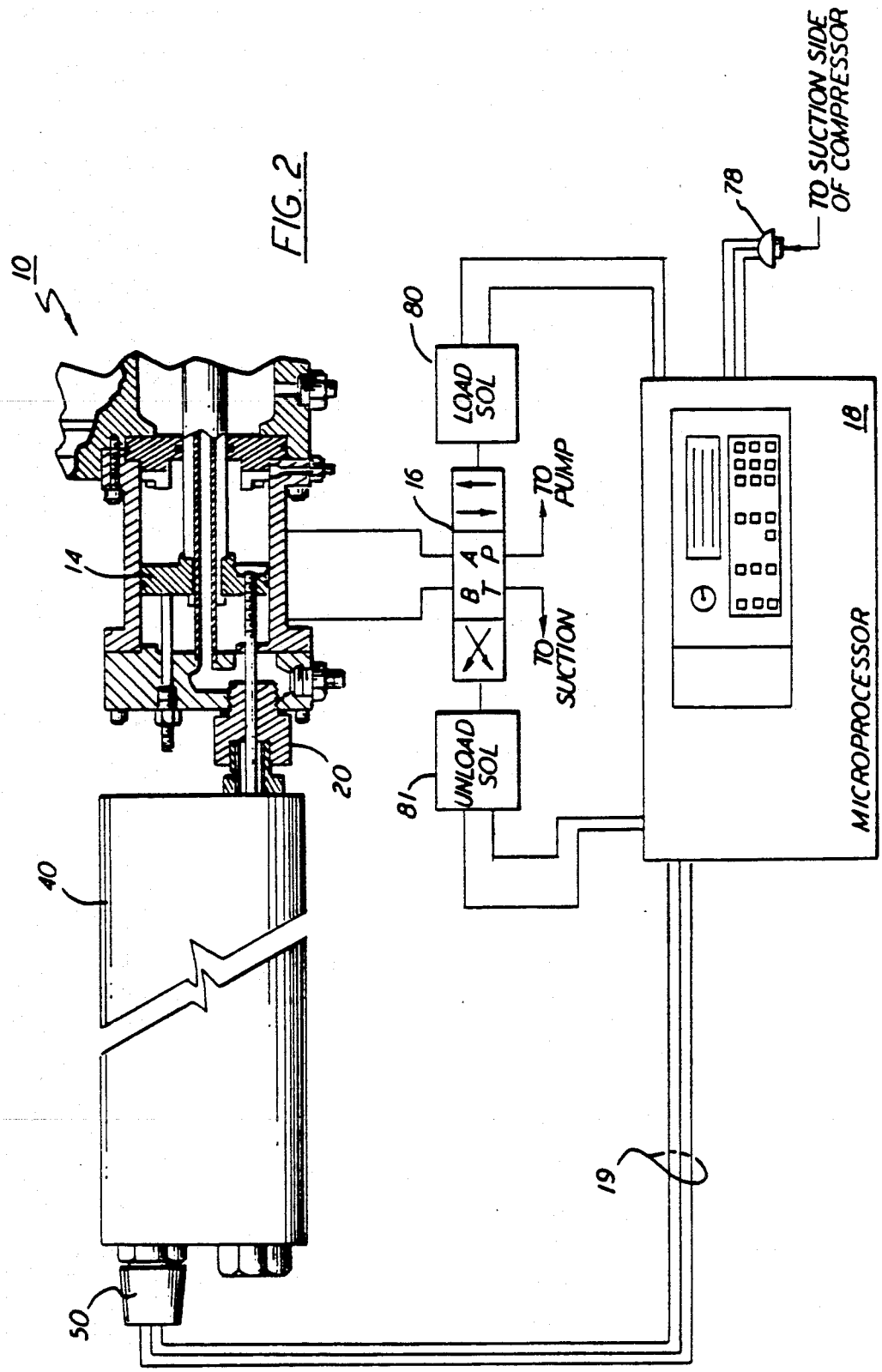
FIG. 2 is a schematic representation of the microprocessor control.

In FIGS. 1 and 2 the numeral 10 generally designates a screw compressor which is only partially illustrated. As is conventional, capacity control of the screw compressor is achieved by regulating the position of a slide valve 12 which is directly connected to piston 14. Piston 14, and thereby the slide valve 12, is moved by supplying pressurized fluid to the appropriate side of piston 14 via four-way valve 16. The supplying of the pressurized fluid via valve 16 for moving piston 14 is under the control of microprocessor 18 which controls the capacity of screw compressor 10 responsive to system demands.

Figure 4:
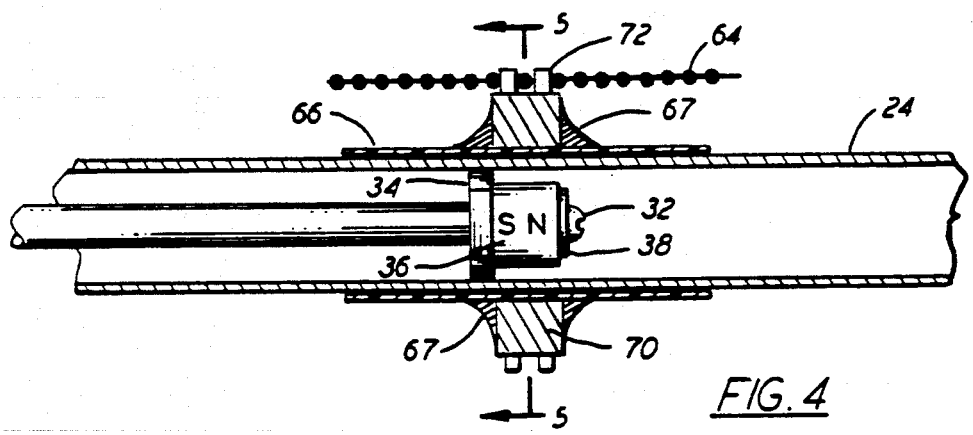
FIG. 4 is a partially sectioned view of a portion of the position indicator.

Threaded adapter 20 is threaded into threaded bore 11 in the housing of screw compressor 10 and compresses 0-ring 21 so as to provide a fluid-tight seal. Stainless steel tube 24 has a flanged collar 26 suitably secured thereto at one end as by welding. Flanged collar 26 is threadedly or otherwise suitably connected to adapter 20. If desired, adapter 20 can be eliminated and flanged collar 26 directly received in bore 11 in a sealed relationship. The other end of tube 24 is closed so that tube 24 defines a closed chamber which is in fluid communication with the portion of the piston chamber located to the left of piston 14 as illustrated in FIGS. 1 and 2. Stainless steel rod 30 has one end threadedly connected to piston 14 and the other end is located within tube 24. As best shown in FIG. 4, screw 32 secures nylon spacer 34, cylindrical cobalt magnet 36 and washer 38 to the end of rod 30 which is located within tube 24. Spacer 34, magnet 36 and washer 38 must have sufficient clearance with the interior of tube 24 to prevent their coacting with the closed end of tube 24 in the nature of a dashpot as the slide valve, piston 14, rod 30 and magnet 36 move as a unit. A pair of flats 34a and b are formed in otherwise circular spacer 34 to permit the flow of fluid past spacer 34 which is the largest diameter member in tube 24.

The tube 24 is located in a sealed, unpressurized chamber defined by tube 40 and end plates 42 and 44 which are sealed to tube 40 by O-rings 43 and 45, respectively, to provide a water tight fitting. Mounting plate 48 is bolted to end plates 42 and 44 by a plurality of bolts 49 and serves to fixedly locate end plates 42 and 44 with respect to each other. End plates 42 and 44 are located with respect to tube 24 by mounting rings 52 and 56 which are secured to end plates 42 and 44, respectively, by screws (not illustrated).

Figure 5:
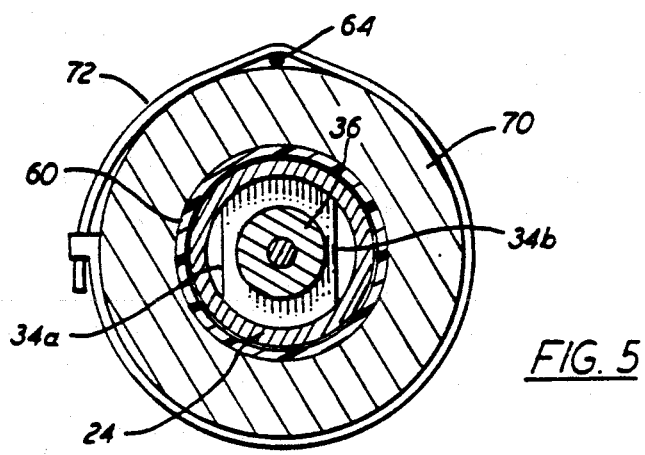
FIG. 5 is a sectional view taken along line 5—5 of FIG. 4.

Mounting rings 52 and 56 are secured to tube 24 by set screws (not illustrated) when the structure located in tube 40 is properly located with respect to tube 24. A pair of bead chain sprockets 60 and 62 are spacedly mounted on mounting plate 48. Bead chain 64 is strung over sprockets 60 and 62 so that they move together as a unit. Tube 24 is partially covered by a tubular shim or sheath 66 which is made of Teflon or some other suitable material and which provides a frictionless surface. Annular cobalt magnet 70 is secured to sheath 66 by silicone rubber 67 and is of opposite polarity to cylindrical magnet 36. Annular magnet 70 is secured to bead chain 64 by a cable tie 72, as is best illustrated in FIGS. 4 and 5, or any other suitable means.

Figure 3:
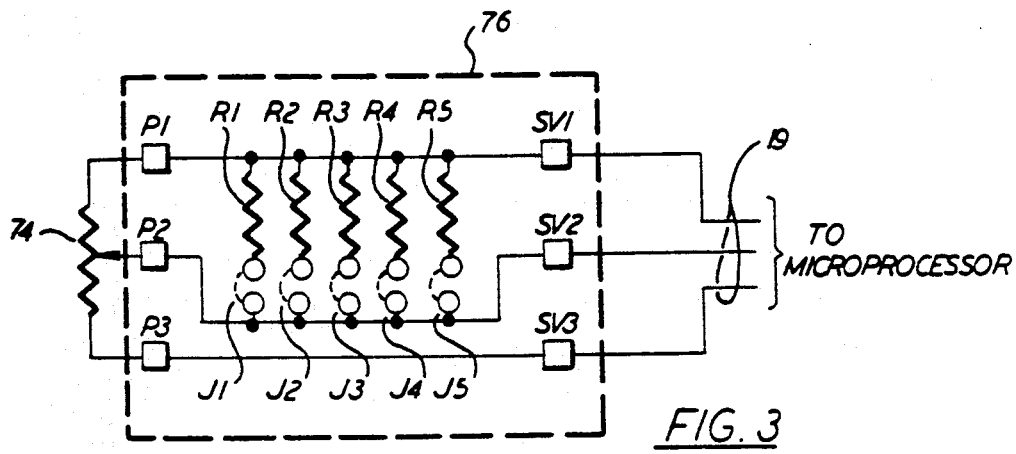
FIG. 3 is a schematic representation of the circuit board.

Sprocket 62 is directly connected to rotary potentiometer 74 which outputs an electrical signal proportional to the linear movement of magnets 36 and 70. Referring specifically to FIGS. 2 and 3, potentiometer 74 is connected to circuit board 76 and circuit board 76 is connected to microprocessor 18 via wires 19 which pass through cord grip 50. As best shown in FIG. 3, circuit board 76 has terminals P1, P2, P3, SV1, SV2 and SV3. Calibration resistors R1-R5 are selectively connected into the circuit by jumpers J1-J5 respectively. Different types of compressors use different calibration resistors R1-R5 but only one jumper J1-J5 is used at any one time so that only one of the calibration resistors R1-R5 is in the circuit at any one time.

Microprocessor 18 is operatively connected to suction pressure transducer 78 which is, in turn, connected to the suction side of compressor 10. Additionally, microprocessor 18 is operatively connected to loading solenoid 80 and unloading solenoid 81 for positioning four-way valve 16 and thereby piston 14 and slide valve 12. Thus, microprocessor 18 receives compressor suction pressure information from suction pressure transducer 78 and slide valve position feedback information from potentiometer 74 for controlling four-way valve 16 through solenoids 80 and 81 to position piston 14 and thereby slide valve 12 to maintain a desired suction pressure set point which is inputted into the microprocessor 18.

In assembling the slide valve position indicator and magnetic coupling, adapter 20 is installed in bore 11 and rod 30 is secured to piston 14. Magnet 36 is secured to the end of rod 30 and closed tube 24 is placed over magnet 36 and rod 30 and secured to adapter 20 so that the interior of tube 24 is sealed from the environment. Since the tube 24 and housing of screw compressor 10 now contains air, it must be bled out and this is done in any satisfactory conventional manner. The hydraulic system can then be pressurized via four-way valve 16 to act on piston 14 to cause the slide valve 12 to move to one extreme position which also results in the movement of magnet 36 to one extreme position. Cord grip 50 is installed in end plate 44. Mounting ring 52, end plate 42, sheath 66 and attached magnet 70, end plate 44 and mounting ring 56 are sequentially placed on tube 24. Magnet 70 is placed on tube 24 so as to be of opposite polarity to that of magnet 36. Sheath 66 and attached magnet 70 are adjusted on tube 24 such that magnet 70 is located at the same axial position as magnet 36 to indicate the correct position of the slide valve 12. If mounting plate 48 was not attached to end plates 42 and 44 when they were placed on tube 24, then the mounting plate 48 is secured to the end plates 42 and 44 and sprockets 60 and 62, potentiometer 74 and circuit board 76 secured thereto. Potentiometer 74 is adjusted to be at an extreme position corresponding to the extreme position of the slide valve and the proper jumper J1 to J5 is connected according to what specific compressor 10 is being used. Mounting rings 52 and 56 are then secured in place and magnet 70 is connected to bead chain 64 by cable tie or the like 72. Wires 19 are brought through cord grip 50 and attached to circuit board 76 and microprocessor 18. Cord grip 50 provides a water tight connection for wires 19. Tube 40 is then placed over the other structure so as to define a sealed chamber with end plates 42 and 44.

In operation, under the control of microprocessor 18 and responsive to the compressor suction pressure sensed by suction pressure transducer 78, hydraulic pressure is supplied via four-way valve 16 to piston 14 by actuation of solenoid 80 or unloading solenoid 81 to move the slide valve 12 in the desired direction, there is a corresponding movement of magnet 36 within tube 24 since magnet 36 is directly connected to piston 14 via rod 30. Because magnet 36 and magnet 70 are each strong magnets and magnetically coupled, and because of the friction reducing effects of sheath 66, magnet 70 and sheath 66 are moved along the outside of tube 24 as magnet 36 moves in tube 24 due to the mutual magnetic attraction which keeps their relative positions constant. Because magnet 70 is secured to bead chain 64, as magnet 70 is linearly moved in response to the reciprocating movement of magnet 36, bead chain 64 is forced to move along with magnet 70 and thereby produces rotary movement of sprockets 60 and 62. Rotary motion of sprocket 62 produces a corresponding rotary motion in rotary potentiometer 74 whose resistance is thereby changed. The change in resistance of potentiometer 74 is communicated to the microprocessor 18 via circuit board 76 and lines 19 and provides a feedback signal indicative of the actual position of the slide valve 12. The sensed compressor suction pressure supplied by transducer 78 and the feedback signal indicative of the position of slide valve 12 thus provide sufficient information to microprocessor 18 to control the actuation of loading solenoid 80 or unloading solenoid 81 to reposition piston 14 as required, to thereby reposition slide valve 12.

Although a preferred embodiment of the present invention has been illustrated and described in terms of a screw compressor, the device can be used to transmit motion from other pressurized environments without requiring a dynamic seal. Also, if desired tube 40 can be transparent and indicia may be provided to indicate the relative position of magnet 36 and thereby the position of slide valve 12. It is therefore intended that the scope of the present invention is to be limited only by the scope of the appended claims.

What is claimed is:

1. A linear-to-rotary motion converting means for converting linear motion of a first member in a pressurized environment to rotary motion of a second member in a non-pressurized environment comprising:

a nonmagnetic, closed tube adapted to be in fluid communication with the pressurized environment;
rod means having a first end adapted to be secured to said first member and a second end within said tube so that said rod means moves in said tube responsive to linear movement of said first member;
first magnetic means secured to said second end of said rod means so as to be movable with said rod means in said tube;
second magnetic means surrounding said tube and magnetically coupled to said first magnetic means so as to be movable therewith; and
a linear-to-rotary motion converter coupled to said second magnetic means whereby linear movement of said second magnetic means produces a rotary output from said linear to rotary motion converter.

2. The linear-to-rotary motion converting means of claim 1 wherein said linear-to-rotary motion converter includes a pair of spaced sprockets connected by chain means with one of said sprockets producing said rotary output.

3. The linear-to-rotary motion converting means of claim 2 wherein said rotary output drives a rotary potentiometer.

* * * * *